Dec. 11, 1951  R. N. GREEN  2,578,539
AIRCRAFT CABIN PRESSURIZING
Filed Oct. 1, 1947  2 SHEETS—SHEET 2
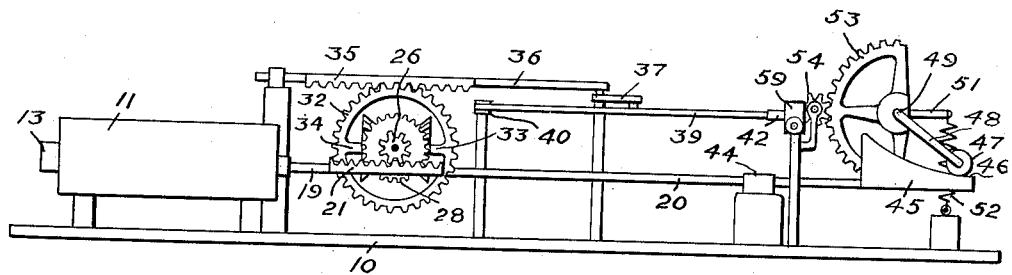
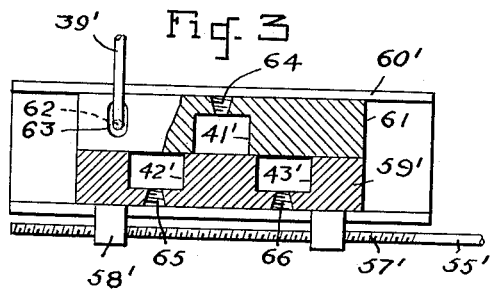
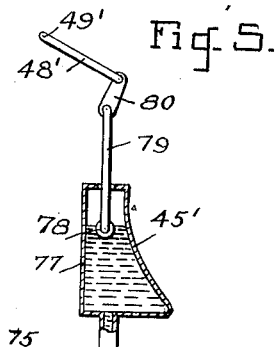
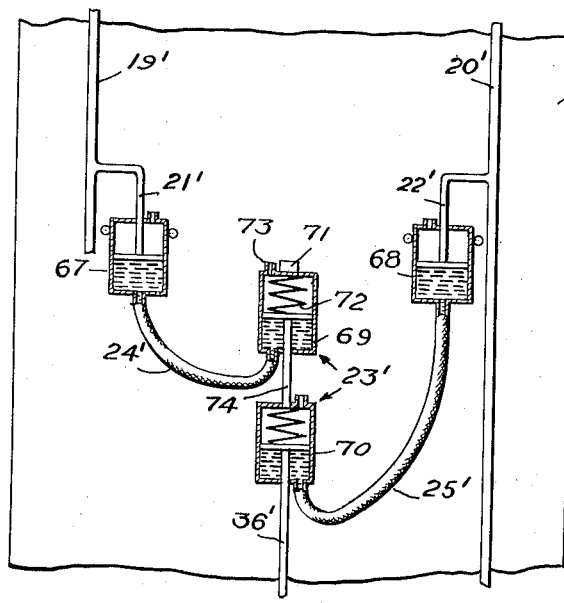
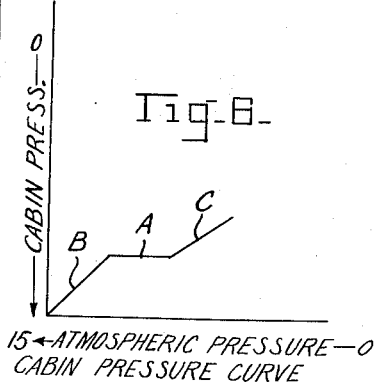
INVENTOR.
Robert N. Green
BY
Stowell & Evans
Attorneys.

Patented Dec. 11, 1951

2,578,539

UNITED STATES PATENT OFFICE 2,578,539

AIRCRAFT CABIN PRESSURIZING

Robert N. Green, New York, N. Y.

Application October 1, 1947, Serial No. 777,170

9 Claims. (Cl. 98—1.5)

1

This invention relates to aircraft cabin pressurizing, to a control device therefore, and to a method of controlling the pressure in an aircraft cabin or the like.

An object of the invention is to provide a device and method for controlling an aircraft cabin pressurizing system to maintain a preselected differential pressure between the cabin and the ambient atmosphere, which differential pressure is automatically adjusted in response to variations in the ambient pressure.

Another object is to provide a device of this character that is composed of a minimum of parts, that may be manufactured at relatively low cost, that is simple to adjust and repair, that is light in weight, and that may be readily installed in aircraft to control an existing pressurizing system.

The foregoing and other aims, objects and advantages of the invention are realized in a device for controlling an aircraft cabin pressurizing system including means for actuating a cabin pressure regulating device in response to variations in the differential between cabin pressure and external pressure, and means for varying the rate of response of said actuating means in predetermined relation to variations in the external pressure.

The device of the invention is adapted to control any conventional cabin pressurizing system, for example, a system wherein an air pump running at constant speed delivers air from the ambient atmosphere to the cabin and the pressure within the cabin is controlled by a vent having a valve that is opened or closed by a modulating motor to impose more or less back pressure upon the system as called for by the control device. It will be apparent that the control device of the invention is not limited in its application to the foregoing specific pressurizing system, but is of general utility in this field.

The means for actuating the cabin pressure regulating device (for example, the back-pressure valve of the system referred to in the previous paragraph) in response to variations in the differential between cabin pressure and external pressure may include a pair of pressure responsive devices, such as Sylphon bellows, one of which is responsive to cabin pressure and the other of which is responsive to the pressure of the ambient atmosphere, the pressure responsive devices operating through differential gearing to produce a resultant response controlling the pressure regulating device. Or the specific differential means may take other desirable forms, as will be pointed out more fully hereinafter.

2

Means for varying the rate of response of the differential pressure actuated means in predetermined relation to variations in the external pressure may include a device such as a Sylphon bellows operating through a cam-and-follower device, for example, to vary the position of one of two complementary contact points comprising a switch, the other of the contact points of which is operated by the differential pressure actuated means. Conveniently, the aforementioned cam-and-follower device may be operated by the same Sylphon bellows as is used to introduce the ambient pressure factor into the differential device.

The control device, generally described hereinbefore, will be described with greater particularity with reference to the accompanying drawings, wherein:

Fig. 2 is a left side view of the device of Fig. 1;

Fig. 3 is an enlarged plan view, partly sectioned, of an alternative form of one of the elements of the device;

Fig. 4 is a fragmentary plan view of a modified form of apparatus;

Fig. 5 is a sectional view of an alternative element and

Fig. 6 is a graph showing variations of cabin pressure as an aircraft employing the invention changes altitude.

Figure 1:
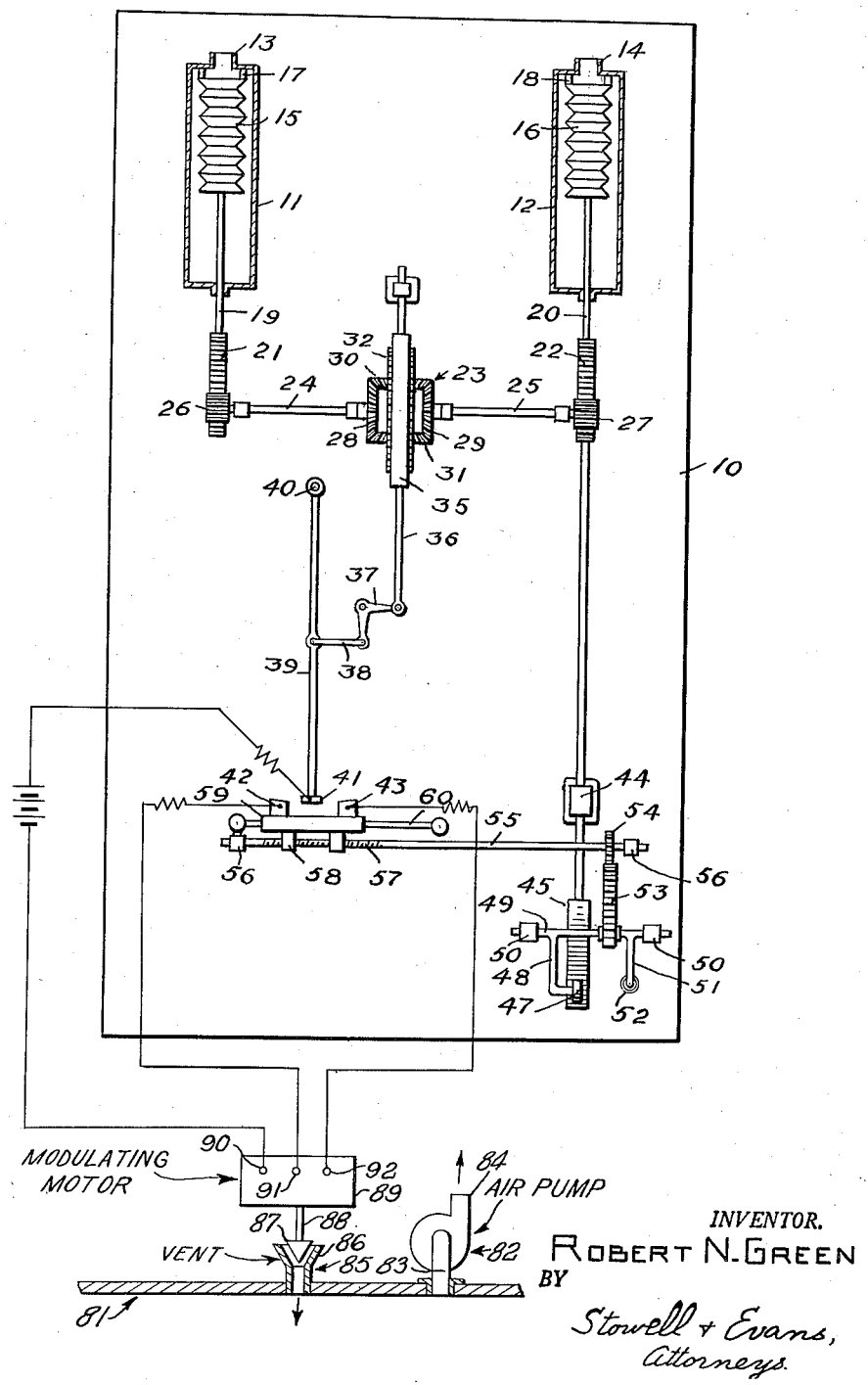
Fig. 1 is a plan view of one form of control device in accordance with the invention.

Referring to Figs. 1 and 2 of the drawings, wherein like reference numerals designate corresponding parts in the two views, the control device shown has a base 10 supporting bellows housings 11 and 12 that are identical. Housing 11 is exposed through opening 13 to pressure within the cabin or other pressurized space of an aircraft or similar machine in which the device is installed. Housing 12 is connected through pipe 14 to the external atmosphere.

Within and on the end walls of the housings 11 and 12 the bellows 15 and 16 are mounted on brackets 17 and 18. The bellows are of the usual metal Sylphon type. Each bellows will expand and contract longitudinally of its housing in response to variations in pressure within the housing.

Push-rods 19 and 20 are attached to the free ends of the bellows and slidingly extend through the ends of the housings. Racks 21 and 22 are carried by the push-rods 19 and 20, respectively.

A differential gearing, generally designated 23, is driven by movement of the push-rods 19 and 20 through shafts 24 and 25 carrying pinions 26 and 27 engaging the racks 21 and 22.

The differential gearing has side bevel gears 28 and 29 driven by the shafts 24 and 25, and bevel gears 30 and 31 meshing with the gears 28 and 29 as is usual in such devices. A spider or arm gear 32, providing an output case for the differential, has radial shafts 33 and 34 on which the gears 31 and 30 rotate.

A rack 35 meshes with and is driven by the arm gear 32. The rack, through link 36, bell crank 37, and link 38, swings an arm 39 in a horizontal arc about the pivot point 40.

At the outer end of the arm 39 a contact point 41 is mounted and in the arc described by the point 41 are two complementary contact points 42 and 43, the several points coacting to provide electrical switches.

Typically, the control device of the invention is carried within an aircraft having a hull wall 81. An air pump 82 having an intake pipe 83 communicating with the outside atmosphere forces air into the cabin of the plane through the pump outlet pipe 84. The cabin is also provided with a vent 85 establishing communication between the interior of the cabin and the outside atmosphere. The vent has a valve seat 86 and cooperating valve 87 carried by a rod 88. A modulating motor 89 moves the valve axially into and out of the seat to impose more or less back pressure against the cabin pressure created by the air pump, as is conventional.

The modulating motor has a common terminal 90 which is electrically connected through a battery 91, or other source of current, to the contact point 41 of the control device. The motor also has a "close-valve" terminal 91 connected to the contact point 42 of the control device and an "open-valve" terminal 92 connected to the contact point 43. It will thus be seen that when the contact points 41 and 43 are closed the cabin pressurizing system is actuated, by movement of the valve 87 towards fully closed position, to increase the cabin pressure; when the contact points 41 and 42 are closed the pressurizing system is actuated, by movement of the valve 87 towards fully open position, to reduce the cabin pressure; and when the point 41 is out of contact with both of the points 42 and 43 the valve 87 and the pressurizing system are inactive.

Thus far there has been described a mechanism whereby cabin pressure is controlled in response to variations in the differential between cabin pressure and external pressure. There will now be described a mechanism for varying the rate of response of the differential control means in predetermined relation to variations in the external pressure.

The latter mechanism is conveniently operated by the bellows 16 responsive to external pressure. For this purpose, the push-rod 20 is extended through a bearing 44 and terminates in a cam 45. The cam track 46 is engaged by a follower wheel 47 carried by arm 48 integral with shaft 49 journalled in bearings 50. The shaft has another arm 51 urged downwardly by spring 52 to maintain the follower wheel in contact with the cam track.

A segmental gear 53 meshes with another gear 54 that is integral with a shaft 55 journalled in bearings 56. The shaft has a portion 57 that is screw-threaded through internally threaded lugs 58 on contact point carriage 59. The carriage is mounted on a rod 60 for transverse sliding movements.

It will thus be seen that horizontal movements of the cam 45 will cause rotational movement of the threaded shaft 55 and corresponding translatory movements of the carriage 59, whereby to shift the neutral point between electrodes 42 and 43, and the electrodes themselves, in a right or left direction as seen in Fig. 1.

It will be seen that if the cabin or internal pressure is to be kept constant at, say normal atmospheric or other pressure, regardless of the altitude of the plane, the gear ratios and cam shape will be so chosen that the carriage 59 is moved at the same rate and in the same direction as the contact point 41 when the bellows 15 is held in fixed position and the bellows 16 alone actuates the differential and the cam-follower device. Under these circumstances, any drop in cabin pressure below normal atmospheric pressure will move the contact point 41, or will change its rate of movement if the plane is ascending or descending, to bring the point 41 into contact with the point 43 to close circuits effecting an increase in cabin pressure. Conversely, an increase in cabin pressure will cause the points 41 and 42 to make contact and lower the cabin pressure. This condition is illustrated in Fig. 6 by the portion of the curve designated by the letter "A."

It will also be seen that if the cabin pressure is to be maintained at a value equal to the ambient atmosphere, the gear ratios and cam shape will be modified so that the carriage 59 is moved at the same rate and in the same direction as the contact point 41 when the bellows 15 and 16 both are allowed to expand against ambient pressure. The portion of the curve in Fig. 6 marked "B" illustrates this condition.

Now, by changing the contour of the cam 45 to a desired shape, it is possible to fix the cabin pressure at any desired value for any given altitude. In one exemplary modification, the profile of the cam has a contour such that the carriage 59 travels to the right, as seen in Fig. 1, slightly faster than the contact point 41 whereby the cabin pressure is gradually lowered as the aircraft rises but is lowered at a rate somewhat less than the external pressure drop. The cam will, of course, be so fashioned that a safe pressure drop across the walls of the aircraft hull is never exceeded. In Fig. 6, the portion of the curve designated "C" illustrates this mode of operation.

With the apparatus of the present invention, cabin pressures may be decreased gradually and smoothly from ground level to the limit of passenger comfort or to the safety limit of pressure drop across the hull, whichever is reached first. Such control is highly desirable and readily achieved by suitable cam design.

It will be understood that various modifications may be made in the control device. In Fig. 3 there is shown a fluid analogue of the electrical switch embodied in the device of Figs. 1 and 2. In Fig. 3, the primed reference numerals designate parts performing functions similar to parts in Figs. 1 and 2 designated by unprimed numerals.

Referring to Fig. 3, the fluid distributor shown has a fixed bed 60' in which the cooperating valve elements 59' and 61 are longitudinally and independently slidable. The arm 39', driven by differential gearing as is the arm 39 in Fig. 1, has a finger 62 depending into a slot 63 in the slide 61, and this arm moves the slide 61 in a manner similar to movements of the contact point 41 of Fig. 1.

The shaft 55′, threaded at 57′ and screwed into the lugs 58′, causes movements of the slide 59′ similar to those caused by the action of the shaft 55 on the contact point carriage 59 of the device of Fig. 1. The port 41′ corresponds to the contact point 41 and ports 42′ and 43′ corresponds to the contact points 42 and 43 respectively.

Flexible fluid connections may be screwed in the tapped holes 64, 65, and 66. A source of fluid under pressure may be connected to the port 41′; a conduit operating to open a back pressure valve in the aircraft may be run from the port 42′ and another conduit extending from the port 43′ may be employed to close the back pressure valve in the pressurizing system.

It is believed that the operation of the valve of Fig. 3 will be readily understood in view of the description given hereinbefore of the operation of the electrical switch of Figs. 1 and 2.

In Fig. 4 there is shown a fluid analogue of the differential gearing and drive of the device of Figs. 1 and 2. In Fig. 4, primed numerals have been applied to parts corresponding to parts bearing the same unprimed numerals in Figs. 1 and 2.

The push-rods 19′ and 20′ are actuated by suitable bellows or other pressure responsive devices. They operate the pistons in cylinders 67 and 68 respectively to force hydraulic fluid through the flexible lines 24′ and 25′ to the lower ends of cylinders 69 and 70.

Cylinder 69 is fixed to a bracket 71 anchored to the base 10′. Its piston is biased in a downward direction by compression spring 72 in the upper chamber, the latter being open through the vent 73. The piston rod 74 is directly connected to the top of cylinder 70 so that movements of the piston rod 74 result in corresponding movements of cylinder 70.

The cylinder 70 and its piston are similar to the cylinder 69 and its piston except that the piston rod 36′ actuates the arm 39 of Fig. 1 or the arm 39′ of Fig. 3.

It will be seen from inspection of the drawings that downward movement of the push-rod 19′ will cause upward movement of the piston rod 36′ and downward movement of the push-rod 20′ will cause upward movement of the piston rod 36′ and that the movements are additive. Such action parallels the action of the differential gearing of Figs. 1 and 2.

In Fig. 5 there is shown a device that may be substituted for the cam-and-follower device of Figs. 1 and 2. The push-rod 20′, corresponding to the push-rod 20 of Figs. 1 and 2, moves the piston 75 in the cylinder 76 introducing or withdrawing liquid to and from the tank 77. A float 78 moves the arm 48′ to rotate the shaft 49′, corresponding respectively to the arm 48 and shaft 49 of Figs. 1 and 2, this through the medium of rod 79 and link 80.

By varying the curvature of the sidewall 45′ of tank 77, the rate of movement of the arm 48′ with respect to movements of the push-rod 20′ can be varied as desired in a manner analogous to the variations imposed by the cam 45 of Figs. 1 and 2.

In the device as illustrated in Fig. 1, expansion movements of the bellows are added in the differential. It will be apparent that, with suitable modifications, such movements may be subtracted in the differential. For example, if the rack 21 is turned upside down, expansion movements of the bellows are subtracted. In such case, it will be necessary to reverse the functions of the contact points 42 and 43 so that the making of contacts 41 and 42 will effect an increase in cabin pressure and the making of contacts 41 and 43 will result in a decrease in cabin pressure. Gear ratios and cam profiles will be adjusted in accordance with the change.

Likewise, similar changes can be made in the hydraulic or fluid differential device of Fig. 4.

As used in the claims, the term "cabin pressure" is synonymous with "internal pressure." The term "control element" is used herein in a broad sense and includes without limitation the electrical and fluid operated control devices described herein together with their equivalents.

It will be understood that the principles of the invention can be used in the control of pressures within any system subject to varying external pressures.

From the foregoing description it will be seen that the present invention provides a device and method for controlling an aircraft pressurizing system that permits of wide flexibility in the selection of cabin pressures for various altitudes and accurate and automatic adjustment and control of internal pressures in relation to external pressures.

I claim:

1. A device for controlling an aircraft cabin pressurizing system which comprises complementary switch elements for controlling a cabin pressure regulating device, an element responsive solely to variations in cabin pressure, an element responsive solely to variations in external pressure, means for combining said responses to give a resultant response, means for moving one of said switch elements in accordance with said resultant response, and means actuated by variations in external pressure for moving the other of said switch elements in relation to said one switch element.

2. A device for controlling an aircraft cabin pressurizing system which comprises complementary switch elements for controlling a cabin pressure regulating device, an element responsive solely to variations in cabin pressure, an element responsive solely to variations in external pressure, means for combining said responses to give a resultant response, means for moving one of said switch elements in accordance with said resultant response, and means actuated by variations in external pressure for moving the other of said switch elements in non-linear relation to said one switch element.

3. A device for controlling an aircraft cabin pressurizing system which comprises complementary switch elements for controlling a cabin pressure regulating device, a Sylphon bellows responsive to variations in cabin pressure, a Sylphon bellows responsive to variations in external pressure, a differential gearing having side gears driven by said Sylphon bellows and an output case, means for moving one of said switch elements in response to movements of the output case of said differential gearing, means responsive to movements of said external pressure Sylphon bellows for moving the other of said switch elements in relation to said one switch element.

4. A device for controlling an aircraft cabin pressurizing system which comprises complementary switch elements for controlling a cabin pressure regulating device, a Sylphon bellows responsive to variations in cabin pressure, a Sylphon bellows responsive to variations in external pressure, a differential gearing having side gears driven by said Sylpon bellows and an output case, means for moving one of said switch elements in response to movements of the output case of said differential gearing, means including a cam-and-follower device responsive to movements of said external pressure Sylphon bellows for moving the other of said switch elements in non-linear relation to said one switch element.

5. A device as defined in claim 2 wherein said complementary switch elements include complementary electrical contact points.

6. A device for controlling an aircraft cabin pressurizing system which comprises a switch having complementary switch elements for controlling a cabin pressure regulating device, means responsive to the differential between cabin pressure and pressure external to the aircraft, means for moving one of said switch elements in accordance with the response of said differential pressure responsive means, and means actuated by variations in pressure external to the aircraft for moving the other of said switch elements in relation to said one switch element.

7. A device for controlling an aircraft cabin pressurizing system which comprises complementary control elements for actuating a cabin pressure regulating device, an element responsive solely to variations in cabin pressure, an element responsive solely to variations in external pressure, means for combining said responses to give a resultant response, means for moving one of said control elements in accordance with said resultant response, and means actuated by variations in external pressure for moving the other of said control elements in relation to said one control element.

8. A device as defined in claim 7 wherein said complementary control elements comprise complementary fluid valve means.

9. A device as defined in claim 7 wherein said complementary control elements comprise a switch having complementary electrical contact points.

ROBERT N. GREEN.

REFERENCES CITED

The following references are of record in the file of this patent:

UNITED STATES PATENTS

| Number | Name | Date |
|---|---|---|
| 2,428,283 | Kemper | Sept. 30, 1947 |
| 2,435,819 | Crever et al. | Feb. 10, 1948 |
| 2,445,183 | Orlob | July 13, 1948 |
| 2,447,918 | Teague | Aug. 24, 1948 |
| 2,449,231 | Jerger | Sept. 14, 1948 |
| 2,450,076 | Bechberger | Sept. 28, 1948 |